United States Patent [19]
Iwasaki

[11] Patent Number: 5,216,934
[45] Date of Patent: Jun. 8, 1993

[54] REMOTE CONTROL MECHANISM
[75] Inventor: Hitoshi Iwasaki, Hamamatsu, Japan
[73] Assignee: Sanshin Kogyo Kabushiki Kaisha, Hamamatsu, Japan
[21] Appl. No.: 411,046
[22] Filed: Sep. 21, 1989
[30] Foreign Application Priority Data
Sep. 22, 1988 [JP] Japan .................. 63-238259
[51] Int. Cl.⁵ .................. F16C 1/16; F16C 1/10; G05G 11/00
[52] U.S. Cl. .................. 74/501.6; 74/501.5 R; 74/502; 74/480 B; 74/480 R
[58] Field of Search .................. 74/110, 480 B, 483 R, 74/500.5-502

[56] References Cited
U.S. PATENT DOCUMENTS

| | | | |
|---|---|---|---|
| 3,651,709 | 3/1972 | Booty et al. | 74/501.6 X |
| 3,842,689 | 10/1974 | Bagge | 74/483 R |
| 4,020,713 | 5/1977 | Cantley et al. | 74/480 B |
| 4,550,628 | 11/1985 | Yarnell | 74/483 R |
| 4,920,819 | 5/1990 | Uchida et al. | 74/480 B |

FOREIGN PATENT DOCUMENTS 2109887 6/1983 United Kingdom ............. 74/483 R

Primary Examiner—Vinh T. Luong
Attorney, Agent, or Firm—Ernest A. Beutler

[57] ABSTRACT

A remote control mechanism for controlling an outboard drive, throttle and transmission from either of two selected remote operators. When one operator is controlling the outboard drive, control of the outboard drive from the other operator is not permitted because of a series of interlocks. Each of the interlocks include a respective detent members and detent recesses. The detent recesses are sized larger than the detent members so as to provide some lost motion and to accommodate misalignments caused by flexure in the associated actuating cables.

3 Claims, 6 Drawing Sheets

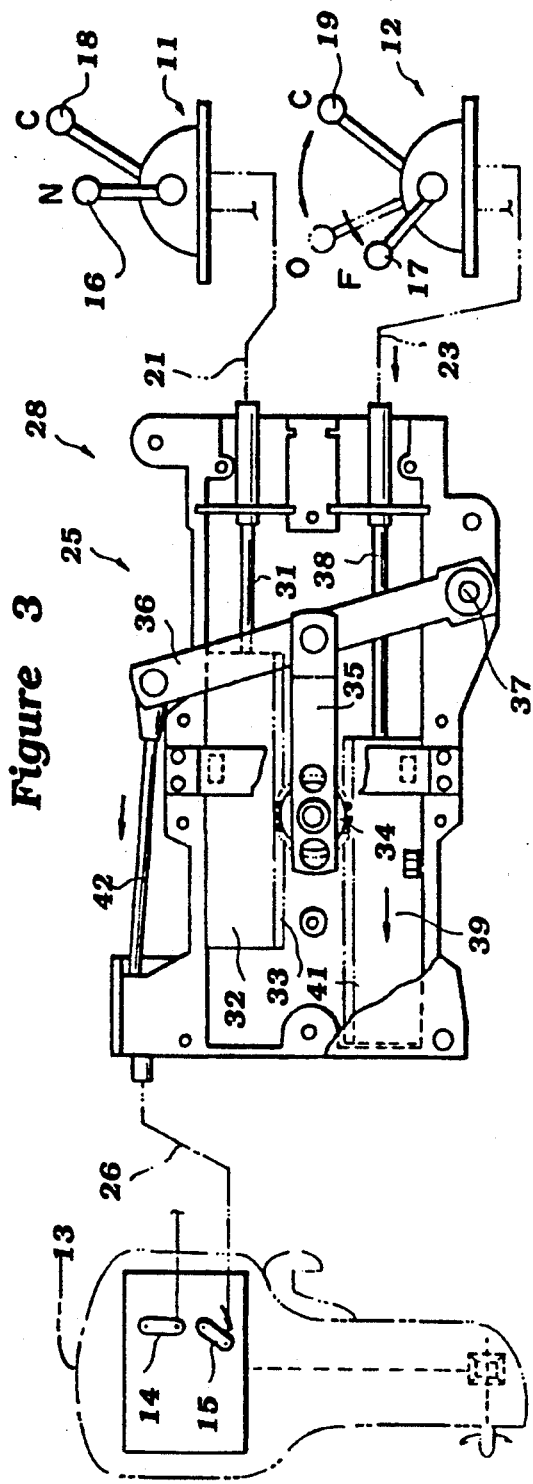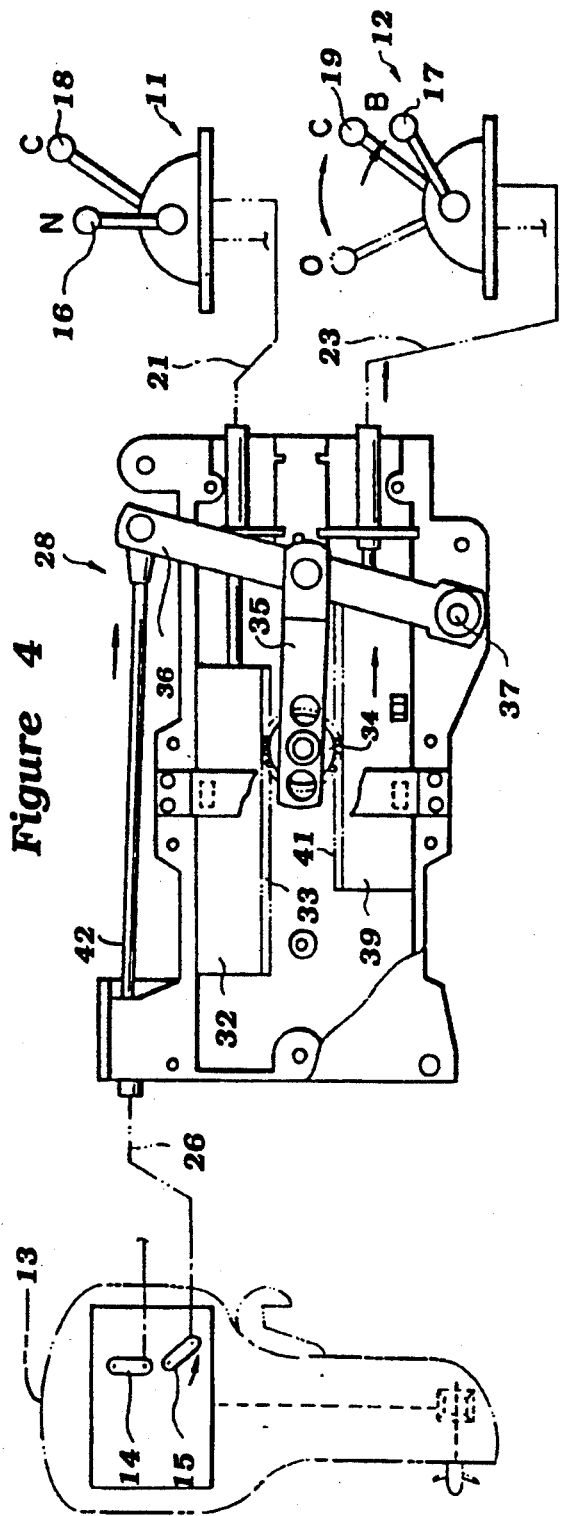

REMOTE CONTROL MECHANISM

BACKGROUND OF THE INVENTION

This invention relates to a remote control mechanism and more particularly an improved remote control mechanism of a type wherein two separate operators may either be selectively operated so as to actuate a controlled member and having an improved interlocking mechanism so that when one of the control operators is being employed to control the controlled member the other operator cannot be actuated.

There are provided a number of types of remote control operators wherein two separately positioned operators may be employed to operate the same controlled member. When such arrangements are incorporated, it is desirable to insure that once the controlled member is operated by one of the operators that the other operator cannot be actuated. For example, it is a common practice on certain watercraft to have throttle and shift controls both at a bridge and in the cabin. When the water craft throttle and shift is being controlled from one location it is desirable to insure that this control cannot be overridden at the other location.

One way in which such interlocking is practiced is to provide a pair of control racks each of which is operated by the respective operator and which both work on the same pinion gear so as to move the controlled member upon rotation of the pinion gear as is affected by reciprocation of one or the other of the control racks. In order to provide the interlock, the control racks are formed with detent recesses and a plurality of detent balls extend through a train extending between these recesses. The balls are positioned so that there is a normal clearance but when one of the racks is reciprocated, the balls are cammed so as to engage the detent recess of the other rack and lock it in position. Although this mechanism has particular advantage, there are also certain disadvantages with it.

For example, it is the normal practice to connect the control operators to the racks with Boden wire cables and also so as to connect the mechanism operated by the pinion gear to the control member by Boden wire cables. Frequently, however, in normal operation, the Boden wire cables may deflect and this can mean that the components are not always in the same position when the interlocking operation is required. Also, the operation of the Boden wire cables and their possible flexure, as occurs when they are connected a pivotally operated member such a marine outboard drive, can mean that the return of the one control operator to its neutral position may not fully release the detent lock. This can mean that control at the other location is not possible.

It is, therefore, a principle object of this invention to provide an improved remote control mechanism.

It is a further object of this invention to provide an improved interlock arrangement for a remote control mechanism which will insure that the interlock can be released even if there are some abnormalities in the location and position of the various components.

SUMMARY OF THE INVENTION

This invention is adapted to be embodied in a remote control mechanism for selectively transmitting control movement from either of a selected pair of operators to a control member. The mechanism includes a pair of slidably supported control elements each of which is operatively connected to a respective one of the operators for reciprocating the control element upon movement of its respective operator. Means transmit movement of each of the control elements into movement of the controlled member. An interlock is provided for precluding operation of one of the control elements when the other control elements is operated. The interlock comprises respective detent recesses in each of the control members and a train of interlocking detents that cooperate with the recesses and which engage the recess of one of the control elements when the other of the control elements is operated. In accordance with the invention, the recesses are greater dimension in the direction of control movement than the cooperating detent for providing some lost motion in the operation so as to insure release when the actuated operator is returned to its normal position.

BRIEF DESCRIPTION OF THE DRAWINGS

FIG. 3 is a top plan view showing the operation of the device from one of the control operators.

FIG. 4 is a view, in part similar to FIG. 3, showing the operation of the control device from the controlled operator in the opposite direction.

DETAILED DESCRIPTION OF THE PREFERRED EMBODIMENT OF THE INVENTION

Figure 1:
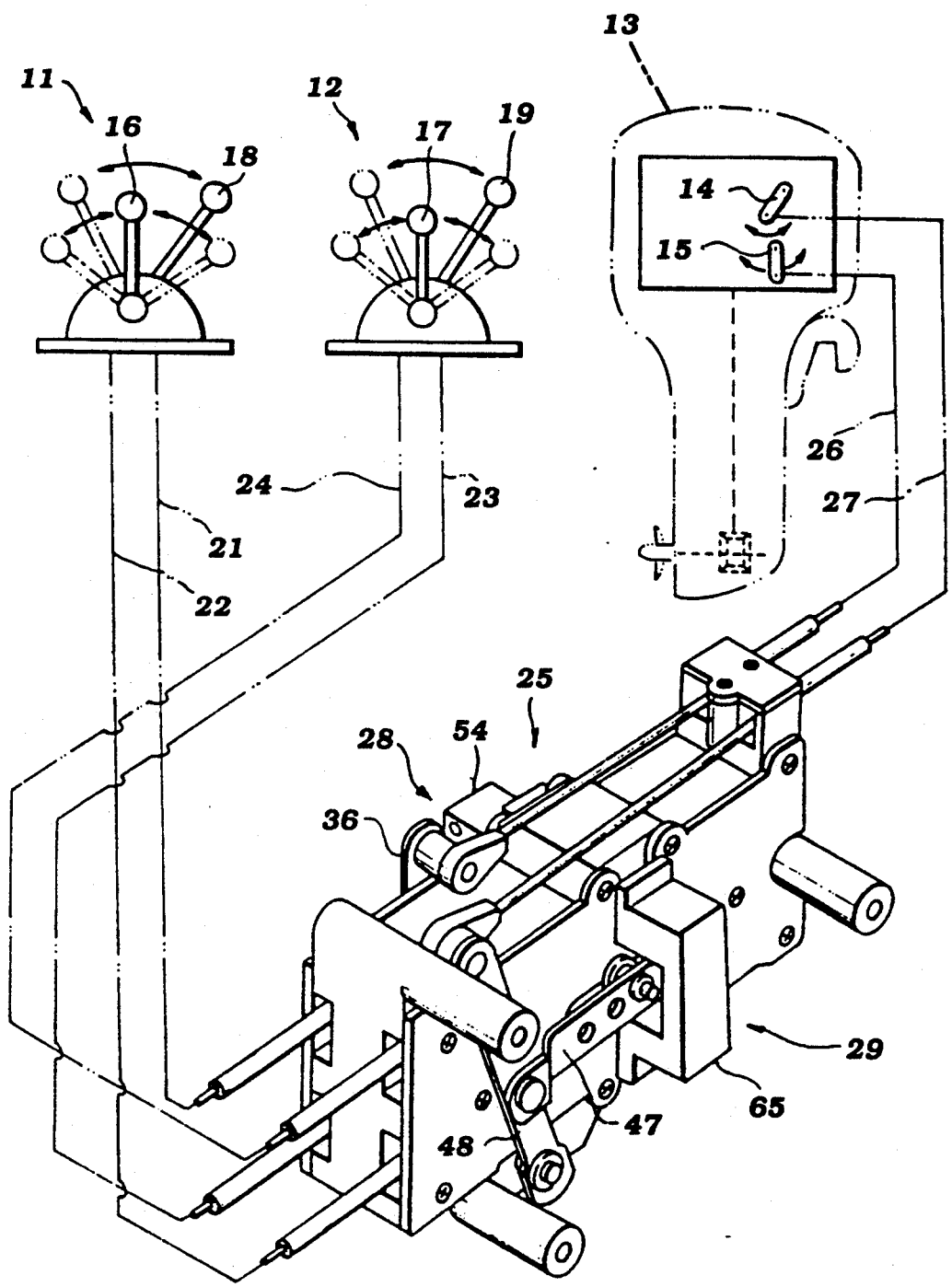
FIG. 1 is a partially perspective, partially schematic view of a remote control operator constructed in accordance with an embodiment of the invention.

Referring first to FIG. 1, a remote control operator mechanism for operating a marine outboard drive from either of two remote locations, indicated generally at 11 and 12 is depicted. The remote locations 11 and 12 may be at such locations as in the cabin or on the bridge of a watercraft. The operators 11 and 12 are provided for controlling a marine outboard drive, indicated partially in phantom and identified generally by the reference numeral 13. The outboard drive 13 may comprise either an outboard motor or the outboard drive portion of an inboard/outboard drive. The outboard drive 13 includes a throttle control lever 14 that is adapted to control the speed of the powering internal combustion engine in a known manner. In addition, there is provided a transmission control lever 15 that is designed to operate a conventional forward, neutral, reverse transmission of the type used with such outboard drives.

Each of the remote control operators 11 and 12 is comprised of a respective transmission control lever 16, 17 and a throttle control lever 18, 19. The transmission control levers 16, 17 are moveable between neutral positions as shown in the solid line views in FIG. 1, a forward drive condition or a reverse drive condition as shown in the phantom line views. In addition, the throttle control levers 18, 19 are moveable between an idle position as shown in the solid line views and toward a fully open throttle condition as shown in the phantom line views.

A Boden wire cable, 21 is connected for actuation with the transmission control lever 16 and a Boden wire cable 22 is connected for actuation with the throttle control lever 18 of the controller 11. In a like manner, a Boden wire actuator 23 is connected for actuation to the transmission control lever 17 and a Boden wire 24 is connected to the throttle control lever 19 of the controller 12. The Boden wire cables 21, 22, 23 and 24 are all connected to a remote control mechanism, indicated generally by the reference numeral 25 that is adapted to actuate either a transmission control Boden wire 26 or a throttle control Boden wire 27. The transmission and throttle control Boden wires 26 and 27 are connected to the outboard drive transmission and throttle control levers 15 and 14. The remote control mechanism 25 includes a transmission operating portion 28 and a throttle control operating portion 29 for achieving this operation. In addition, there is provided an interlock mechanism, to be described, so that operation of the outboard drive 13 from either controllers 11 or 12 will be preclude operation from the outboard drive from the non-controlling operator 11 or 12.

The manner by which the remote control mechanism 25 operates to control the shift lever 15 of the outboard drive 13 will now be described by particular reference to FIGS. 3 and 4. It will be noted that the Boden wire 21 of the control lever 16 is connected to an actuating rod 31 that is slidably supported within the control mechanism 25 and which is connected to a first rack 32. The rack 32 has teeth 33 that are emmeshed with a pinion gear 34 that is rotatably journaled upon a shaft that is carried at one end of the a connecting link 35. The connecting link 35 is pivotally connected at its opposite end to the midpoint of a transmission control lever 36. The transmission control lever 36 is connected to the transmission Boden wire control 26 and is pivotally supported at its other end on a pivot pin 37.

In a similar manner, the Boden wire actuator 23 associated with the shift lever 17 of the controller 12 actuates a slidably supported plunger 38. The plunger 38 is connected to a rack 39 that has rack teeth 41 that are engaged with the diametrically opposite side of the pinion gear 34.

If the transmission control lever 17 of the operator 12 is operated from the neutral position to the forward drive position, the Boden wire 23 will urge the rack 37 to the left as shown in FIG. 3. The rack 32 is then locked in place by an interlock mechanism, to be described, and the pinion gear 34 will rotate along and move to the left as seen in FIG. 3 to exert a pushing force on a control rod 42 that is connected to the lever 36 and the Boden wire cable 26 for shifting the transmission control lever 15 into its forward drive position.

On the other hand, if the transmission control lever 17 is rotated to the reverse position as shown in FIG. 4, the rack 39 will be moved to the right and the pinion gear 34 will move to the right so as to exert a tensile force on the rod 42 and transmission control lever 26 so as to shift the transmission control lever 15 into its reverse drive position.

Figure 5:
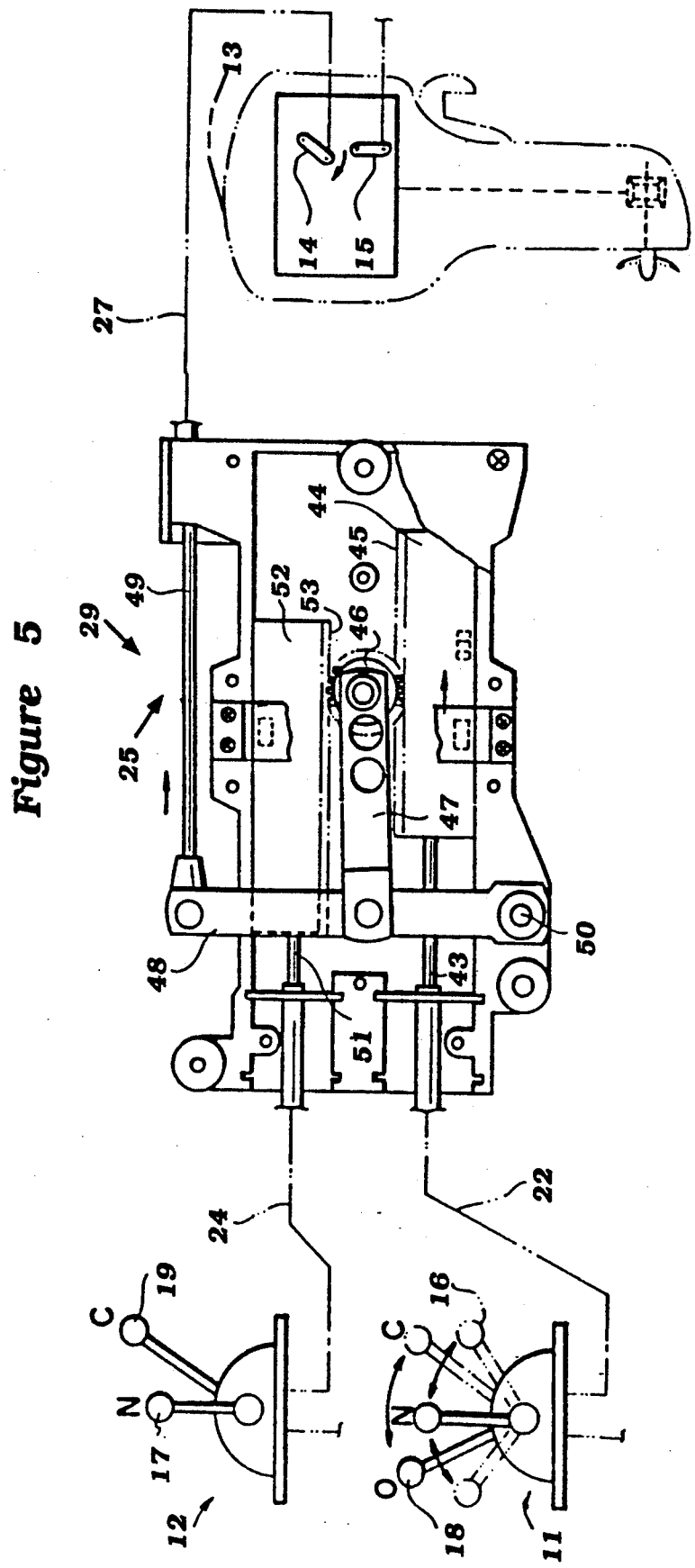
FIG. 5 is a view, in part similar to FIGS. 3 and 4, showing the operation of the throttle control from one operator.

A similar rack and control mechanism is provided in the throttle control portion 29 as shown in FIG. 5. That is, the throttle control wire 22 of the operator 14 is connected to a slidably supported plunger 43 which is, in turn, connected to a rack 44 having teeth 45 that is engaged with a pinion 46. The pinion 46 is rotatably journaled on a shaft at one end of a link 47, the opposite end of which is connected by a pivot pin 50 to a throttle control lever 48. The throttle control lever 48 actuates a plunger 49 that is connected to the push pull cable 27 for operating the throttle lever 14 upon pivotal movement of the lever 48 about a pivot pin 50.

A like manner, the throttle control wire 24 is connected to a plunger 51 that is connected to a rack 52 having teeth 53 that is engaged with the pinion gear 46. As a result, movement of either of the racks 44 or 52 when the other rack is held stationery will effect movement of the pinion gear 46 so as to open and close the throttle by means of the throttle control lever 14.

Figure 2:
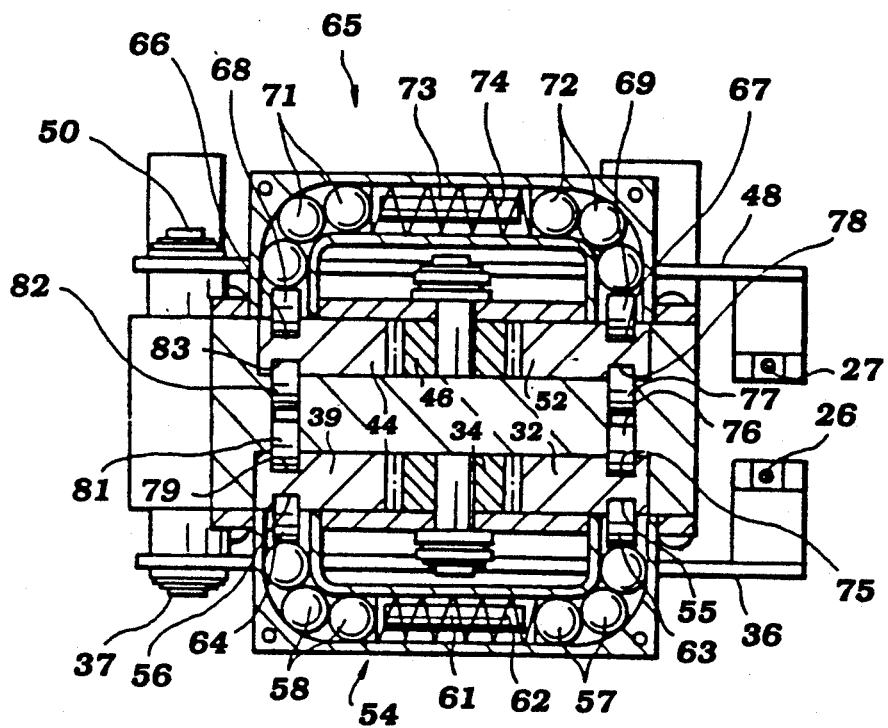
FIG. 2 is an enlarged cross sectional view taken through the interlocking mechanism.
Figure 9:
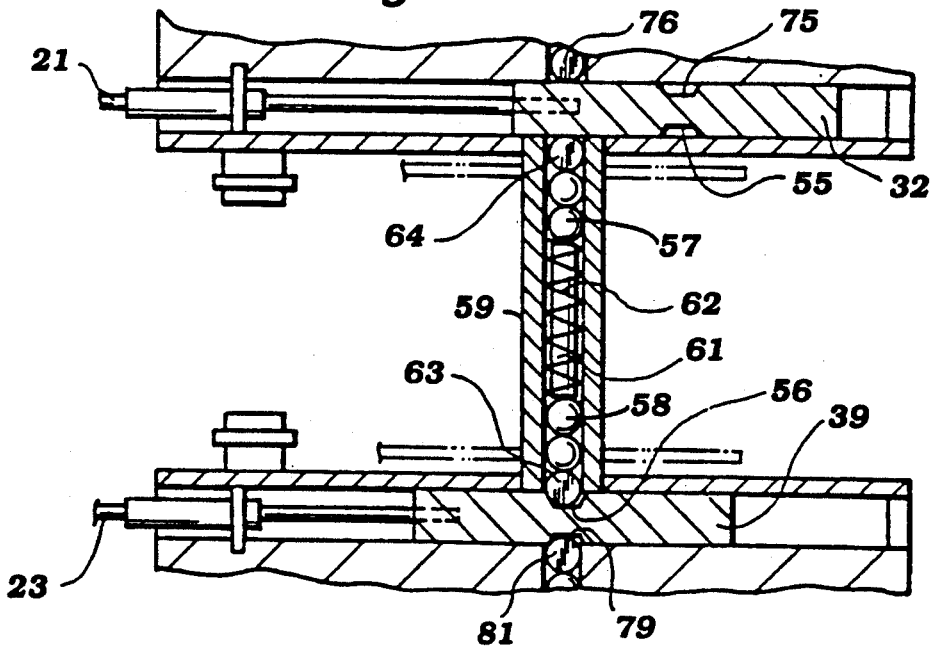
FIG. 9 is a developed view showing another portion of the interlocking mechanism.

There is provided an interlocking system, as aforenoted, for precluding operation of the shift control 15 from either of the shift control levers 16 or 17 when the other of the shift control levers is moved from its neutral positions to its forward or reverse position. This interlock mechanism is indicated generally by the reference numeral 54 and may be best understood by reference to FIGS. 2 and 9. FIG. 2 is a cross sectional view while FIG. 9 is a developed view that shows in more detail how the interlock mechanism operates. It will be noted that the racks 32 and 39 are provided with respective detent recesses 55 and 56 that cooperate with series of balls 57 and 58 respective's which are received within a ball track 59. There is further provided a plunger rod 61 that is normally spaced from the ends of the balls 57 and 58 when the transmission mechanism is in its neutral position and the balls are held in this spaced relationship by a coil compression spring 62 that is loaded between the balls 57 and 58.

There is a detent mechanism 63 associated with the balls 57 and a detent 64 that is associated with the balls 58 to engage the respective detent recesses 55 and 56 in a manner which will be described.

As may be seen in FIG. 9, if the shift control lever 16 of the operator 11 is operated, the rack 32 will be moved so as to urge the detent 63 out of the recess 55. This will compress the ball train 57 and spring 62 so as to engage the rod 61 and urge the balls 58 and detent 64 to a locked position with the recess 56. As a result, when the transmission is being controlled by the lever 16, the lever 17 cannot be operated since the rack 39 will be locked in position.

Figure 8:
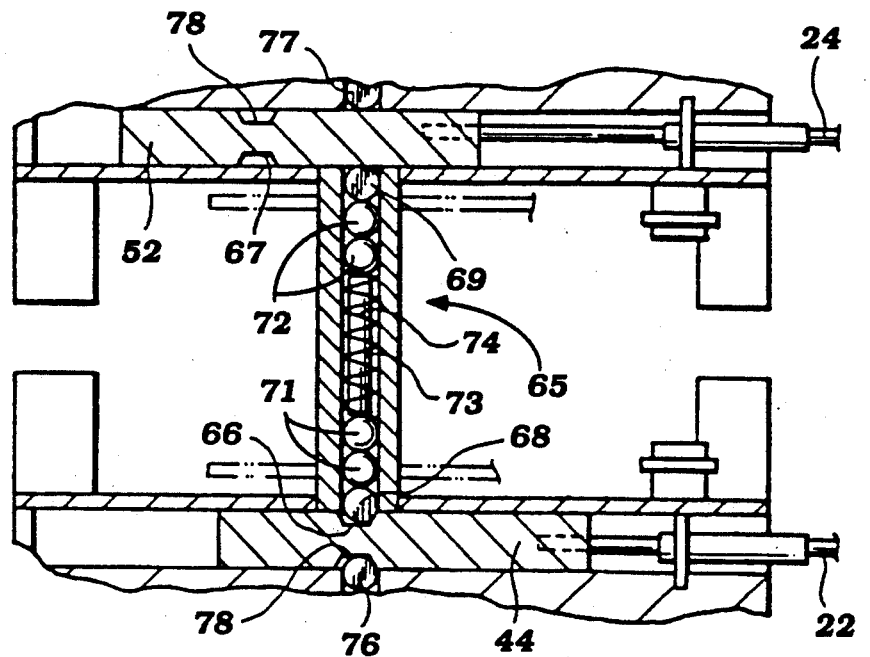
FIG. 8 is a developed view showing the interlocking mechanism in one position.

A similar interlocking mechanism, indicated generally by the reference numeral 65 and shown in most detail in FIGS. 2 and 8 is provided between the racks 44 and 52 so that only one of them can be actuated at a time. This interlocking mechanism includes detent recesses 66 and 67 formed in the racks 44 and 52 respectively. Locking detents 68 and 69 are adapted to cooperate with these recesses 66 and 67 and are interconnected by respective ball chains 71 and 72, a rod 73 and coil compression springs 74 in a manner described in conjunction with the interlocking mechanism 54.

Figure 6:
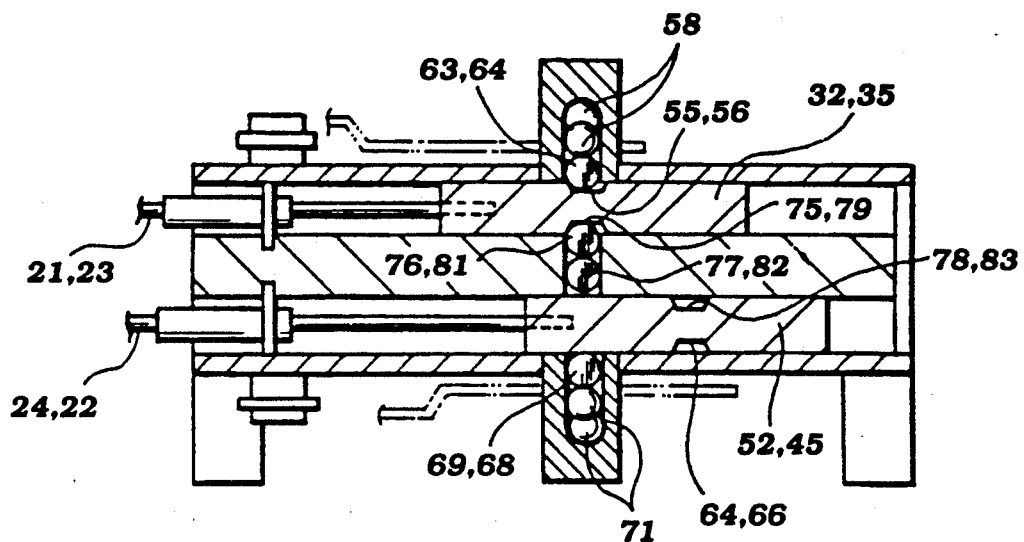
FIG. 6 is a cross sectional view showing the interlocking mechanism in one position of its operation.
Figure 7:
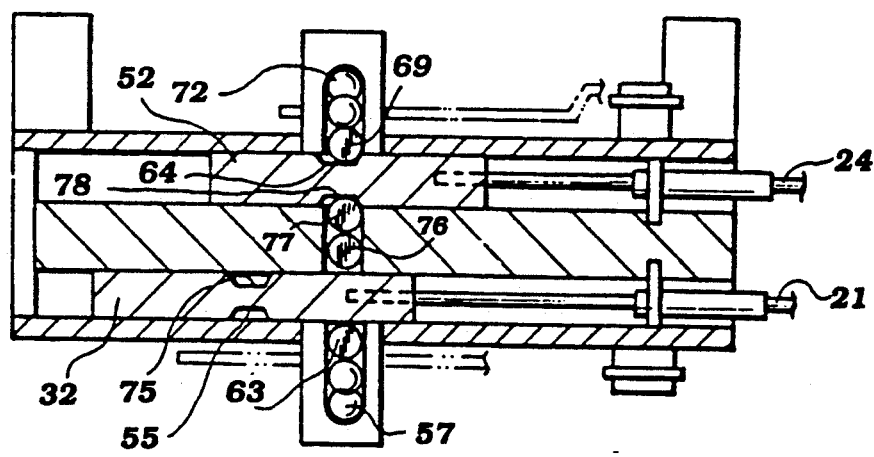
FIG. 7 is a cross sectional view, in part similar to FIG. 6, showing the interlocking mechanism in another position.

In addition to providing a locking mechanism between the transmission controls so that when one of the operators 11 or 12 is used to control the transmission shift lever 15 the other mechanism cannot be used for this purpose, there is also an interlocking mechanism that insures that when the transmission is controlled at one of the operators 11 or 12 that the throttle cannot be controlled from the other operator. This mechanism comprises an interlocking relationship that operates between the rack 32 and the rack 52 and the rack 39 and the rack 44. This locking mechanism may be best understood by reference to FIGS. 2, 6 and 7. If will be noted that the rack 32 in addition to the detent recess 55 has a further detent recess 75 positioned on its opposite side and which faces a detent 76. A further detent 77 is engaged with the detent 76 and is adapted to enter into a detent recess 78 formed in the rack 52. Accordingly, when the rack 32 is shifted so as to control the transmission from the transmission control lever 16 of the controller 18, the detent 77 will move into the detent recess 78 and lock the rack 52 against movement. As a result, the throttle mechanism cannot be controlled by the throttle lever 19 of the operator 12.

A similar detent mechanism cooperates between the racks 39 and 44. There is detent recess 79 in the rack 39 that cooperates with a detent lock 81 which, in turn, cooperates with a further detent lock 82 that cooperates with a detent recess 83 in the rack 44 so as to lock the racks together in the manner aforedescribed so that when the transmission is being controlled from one station the throttle cannot be controlled from the other station.

In accordance with the invention, all of the detent recesses 66, 67, 56, 55, 75, 78, 79 and 83 are wider and tapered at their ends than the cooperating detent member. Accordingly, if the device is not fully in at home position due to some flexure of the Boden wire cables, the spring action can cause the detent mechanism to move to its position. Alternatively, release is insured in the event of any misalignments due to flexure of the cables.

From the foregoing description it should be readily apparent that the described mechanism is in extremely effective in providing an interlock between respective remote control actuators and for insuring that when the outboard drive is being controlled from one location, overriding controls may not be made at another location. In addition, the detent mechanism is such that misalignments due to flexure of the cables can easily be accommodated due to the width of the detent recesses. Although an embodiment of the invention has been illustrated and described, various changes and modifications may be made without departing from the spirit and scope of the invention, as defined by the appended claims.

I claim:

1. A remote control mechanism for selectively transmitting control movement from either of a selected pair of operators to a control member comprised of a pair of slidably supported control elements each operatively connected to one of said operators for reciprocation of said control elements upon movement of the respective operator, means for transmitting movement of each of said control elements into movement of said control member, and interlock means for precluding operation of one of said control elements when the other of said control elements is operated, said interlock means comprising respective detent recesses in each of said control members in a train of interlocked detents cooperating with said detent recesses to engage the recess of one of said control elements when the other of said control elements is operated, said recesses being of greater dimension in the direction of control movement than said detents for permitting some lost motion in the relative positions therebetween.

2. A remote control mechanism as set forth in claim 1 wherein the control elements are reciprocally supported racks engaged with a single pinion operatively connected to the controlled member.

3. A remote control mechanism as set forth in claim 1 wherein the detent members have a round configuration and the detent recesses have a groove type configuration comprised of a pair of inclined surfaces joined by a flat surface.

* * * * *